United States Patent
Chang

(10) Patent No.: US 7,672,582 B2
(45) Date of Patent: Mar. 2, 2010

(54) PORTABLE ELECTRONIC DEVICE WITH ATTACHABLE CAMERA MODULE

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 946 days.

(21) Appl. No.: 11/416,345

(22) Filed: May 1, 2006

(65) Prior Publication Data

US 2007/0053682 A1   Mar. 8, 2007

(30) Foreign Application Priority Data

Sep. 7, 2005   (CN) .................... 2005 2 0064277

(51) Int. Cl.
*G03B 17/00* (2006.01)
*G03B 17/02* (2006.01)
(52) U.S. Cl. .................... 396/429; 396/541; 348/373
(58) Field of Classification Search ............. 348/14.04, 348/375, 373; 396/429, 535, 541, 419, 428
See application file for complete search history.

(56) References Cited

U.S. PATENT DOCUMENTS

| 6,573,939 | B1 * | 6/2003 | Yokoyama | 348/375 |
| 7,173,661 | B2 * | 2/2007 | Hagiwara et al. | 348/340 |
| 2001/0013890 | A1 * | 8/2001 | Narayanaswami | 348/14.01 |
| 2003/0214727 | A1 * | 11/2003 | Min et al. | 359/696 |
| 2004/0218092 | A1 * | 11/2004 | Kim | 348/375 |
| 2005/0007683 | A1 * | 1/2005 | Ryu et al. | 359/824 |
| 2005/0043057 | A1 * | 2/2005 | Lo | 455/556.1 |

* cited by examiner

*Primary Examiner*—Christopher Mahoney
(74) *Attorney, Agent, or Firm*—Steven M. Reiss

(57) ABSTRACT

A portable electronic device is described that includes a main body 1, an attachable camera module 2 and a connecting mechanism 12. The attachable camera module 2 comprises a sleeve barrel 20, a lens module 22, a focusing mechanism 24, an image sensor module 26, and a signal linker 212 that transfers image signal from the image sensor module 26 to the main body 1. The connecting mechanism 12 connects to the main body 1 and the attachable camera module 2; the connecting mechanism 12 is installed on one side of the main body 1 to support the attachable camera module 2.

20 Claims, 6 Drawing Sheets

PORTABLE ELECTRONIC DEVICE WITH ATTACHABLE CAMERA MODULE

BACKGROUND OF THE INVENTION

1. Field of the Invention

The present invention relates to a portable electronic device with a attachable camera module, such as mobile telephones, electronic notebooks, and so on.

2. Discussion of the Related Art

With the development of wireless communication and information processing, portable electronic devices, such as mobile telephones and PDAs (personal digital assistants), are now in widespread use. These electronic devices enable consumers to enjoy convenience of high technology services, anytime and anywhere. The camera module has been an important member of portable electronic devices.

Generally, there are two kinds of portable electronic devices with a camera module in the market. One kind of portable electronic device has a attachable camera module, and the other has a built-in camera module.

The portable electronic devices with a attachable camera modules have a special port formed thereon in order to connect the camera module. For example, some mobile phones have an attachable camera module that has sufficient space to contain a focusing lens module and a battery, giving its good image quality and meaning that it does not drain the battery of the portable electronic device. However, attachable camera modules generally connect with the portable electronic device with connecting mechanisms such as transmission lines, which results in awkwardness in carrying the portable electronic device.

The portable electronic device with a built-in camera module is easier to carry than the portable electronic device with an attachable camera module. For example, many kinds of mobile phones have built-in camera modules, but this kind of portable electronic device generally uses its own battery to supply power to the camera module, which is likely to shorten the life-span of the battery of the portable electronic device. In addition, functions of the inner camera module are restricted because space in the portable electronic device is confined.

What is needed, therefore, is a portable electronic device with an attachable camera module to overcome above-described problems.

SUMMARY OF THE INVENTION

In a preferred embodiment, a portable electronic device includes a main body, an attachable camera module and a connecting mechanism. The attachable camera module comprises a sleeve barrel, a lens module, a focusing mechanism, an image sensor module, and a signal linker that transfers image signals from said image sensor module to the main body. The connecting mechanism connects the main body and the attachable camera module; the connecting mechanism is installed on one side of the main body to support the attachable camera module.

Other advantages and novel features will become more apparent from the following detailed description when taken in conjunction with the accompanying drawings.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts through out the several views.

DETAILED DESCRIPTION OF PREFERRED EMBODIMENTS

Figure 1:
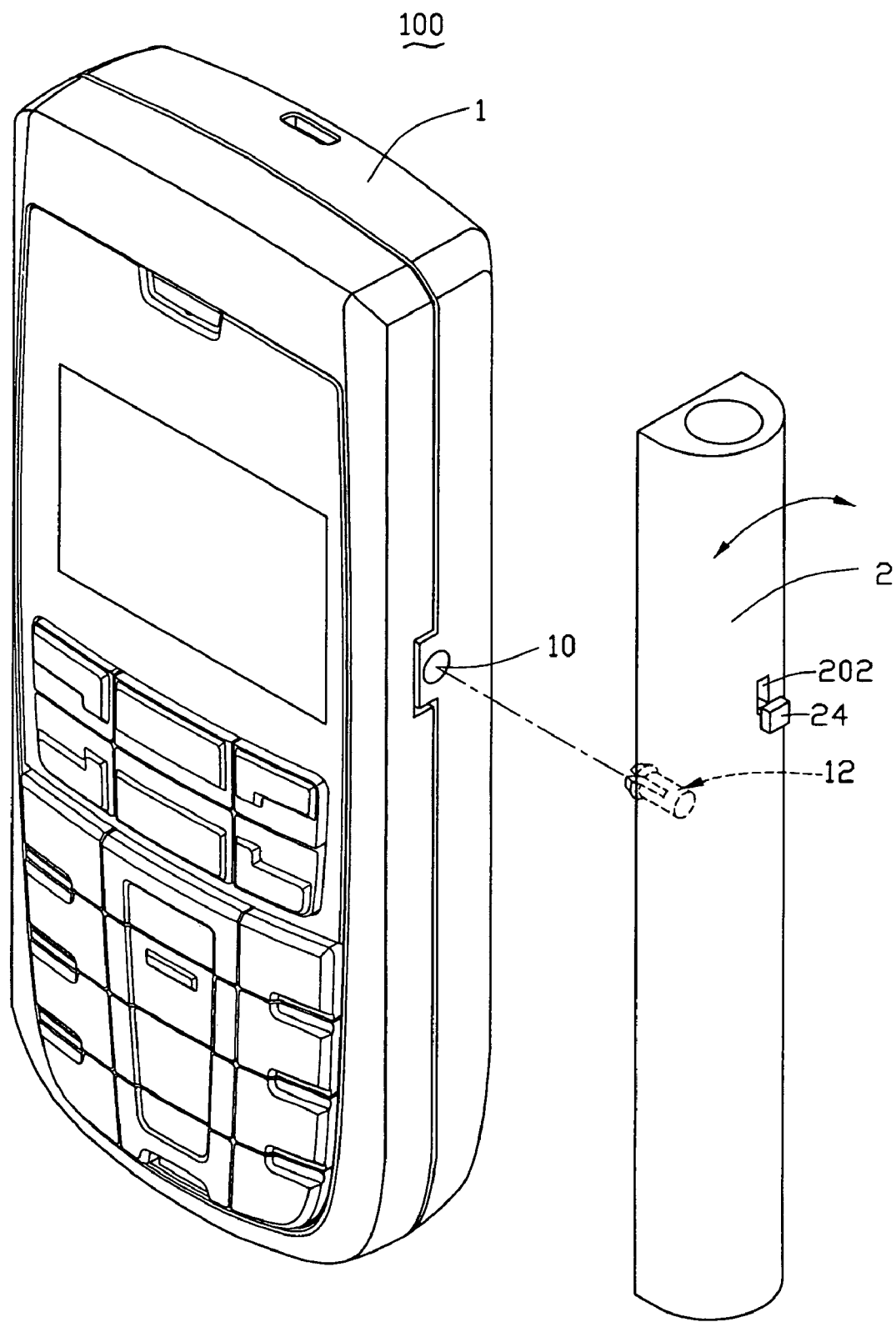
FIG. 1 is an isometric view of a mobile phone including an attachable camera module in accordance with a first embodiment of the present invention.

Referring now to the drawings, FIG. 1 shows a mobile phone 100 according a first embodiment of the present invention. The mobile phone 100 includes a main body 1 and a attachable camera module 2. The attachable camera module 2 connects to the main body 1 via a connecting mechanism 12. The main body 1 has a hole 10 defined in one side thereof. The hole 10 can be circular, square or any other appropriates. The connecting mechanism 12 is an axletree whose one end is received in the main body 1 via the hole 10 and the other end rotatably connects to the attachable camera module 2, thereby mounting the attachable camera module 2 to the main body 1.

Figure 2:
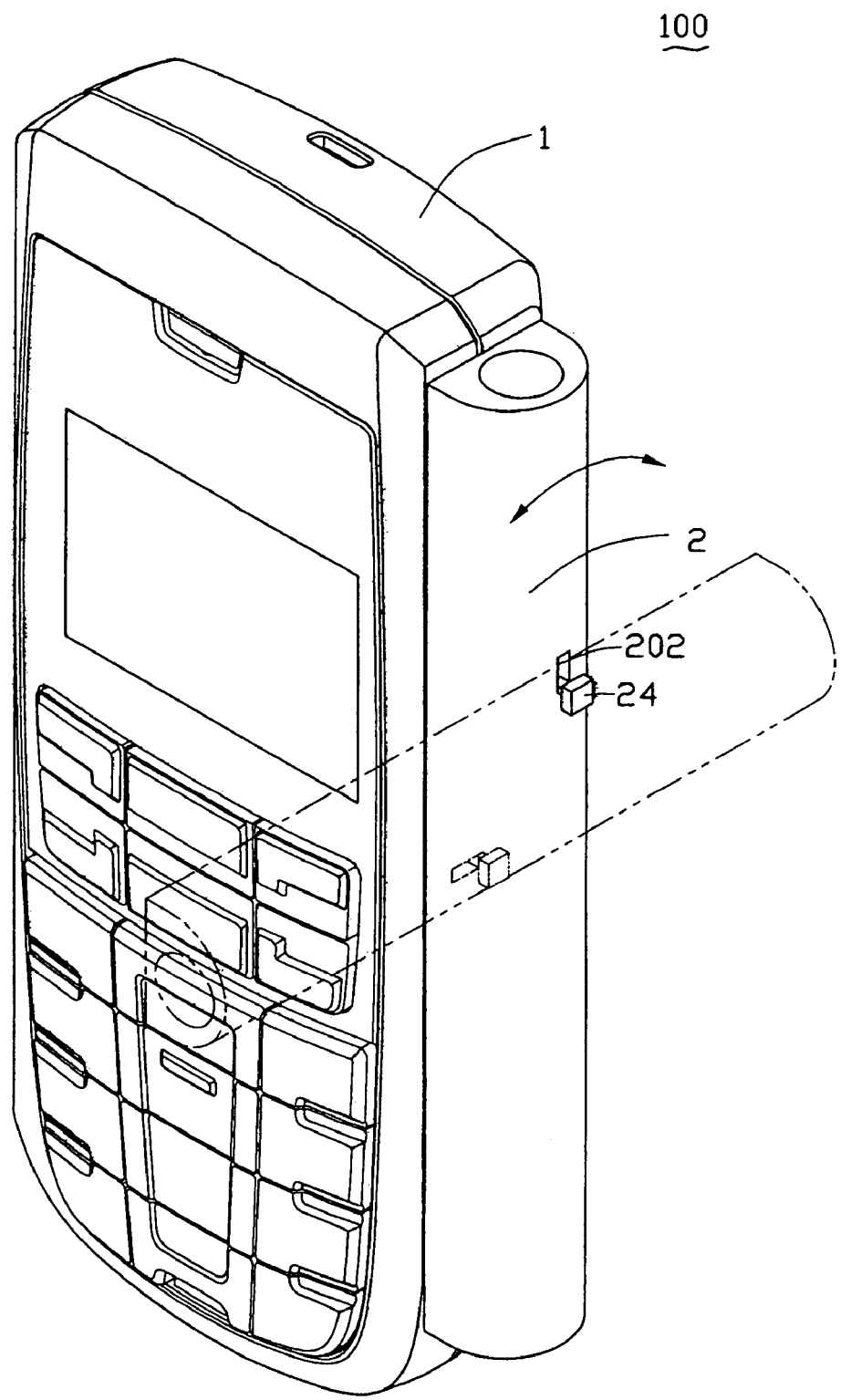
FIG. 2 is an isometric view of the mobile phone illustrated in FIG. 1, showing the attachable camera module pointing in another direction.

Referring to FIG. 2, the attachable camera module 2 can rotate an appropriate angel from an initial position as shown in FIG. 1 to another position that is adapted to focus.

Figure 3:
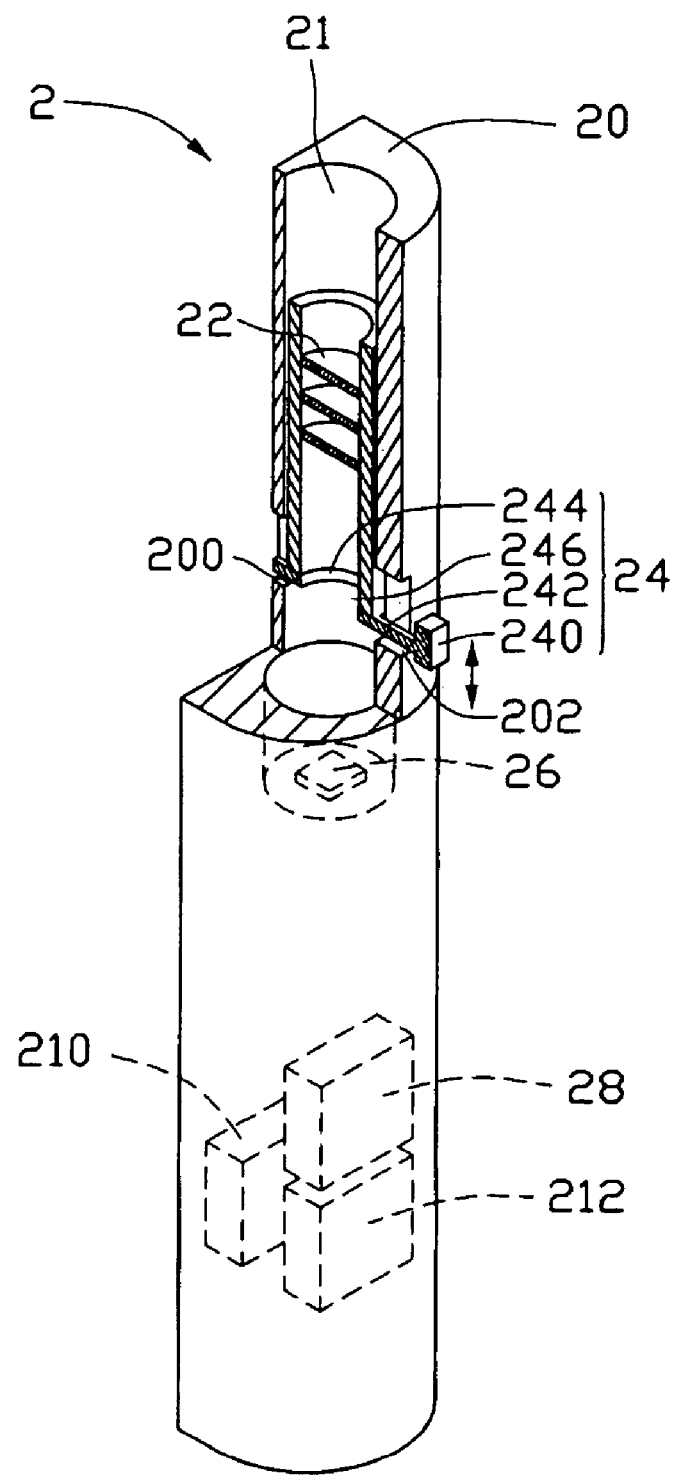
FIG. 3 is a cut-away view of the attachable camera module of FIG. 1.

Referring to FIG. 3, the camera module 2 includes a sleeve barrel 20, a lens module 22, an adjusting mechanism 24, an image sensor module 26, a modulator 28, a battery module 210, and a signal linker 212.

The sleeve barrel 20 is approximately a column that includes a planar side face (not labeled) to attach to the main body 1 and a columnar space 21 to contain the lens module 22. The lens module 22 is a column that can be contained in the sleeve barrel 20 and the lens module 22 defines an inner space for installing a focusing mechanism. The adjusting mechanism 24 comprises a button 240, a gearing pole 242, and a holder 244 for supporting the lens module 22. The button 240 is disposed on an outer surface of the sleeve barrel 20, and the button 240 can slide along a sliding slot 202 defined in the outer surface of the sleeve barrel 20. A slot 200 that serves as a guide for the gearing pole 242 is disposed on the inner surface of the sleeve barrel 20 and the gearing pole 242 fits in the slot 200. One end of the gearing pole 242 is connected to the button 240 and another end connects to the holder 244. The holder 244 is a hollow pipe, and has a hole 246 whose diameter is same as the lenses of the lens module 22 defined therein allowing an optical signal to reach the image sensor 26. One end of the lens module 22 is fixed to the holder 244 and the lenses of the lens module 22 are aligning with the hole 246. The holder 244 connects to the button 240 through the gear pole 242. When a user drives the button 240 along the direction as indicated by the arrow shown in FIG. 3, the gearing pole 242 and the holder 244 are driven to slide along the sleeve barrel 20, thus changing the distance between the lens module 22 and the image sensor 26. Alternatively, a retainer such as a bolt can be installed on the sleeve barrel 20 to fix the lens module 22 at a predetermined distance from the image sensor 26.

The image sensor module 26, the modulator 28, the signal linker 212 and the battery module 210 are all installed in the sleeve barrel 20. The image sensor module 26 aligns with the hole 246 and the lens module 22 for receiving optical image signal from the camera module 20 and transforms the optical image signal into an electrical image signal. The modulator 28 that connects to the image sensor module 26 electrically amplifies and modulates the electrical image signal from the image sensor 26. The signal linker 212 may be a wireless communicator such as a wireless fidelity (Wi-Fi) port or a Bluetooth port that connects the modulator 28 electrically transfers the amplified and modulated image signal to the main body 1. Alternatively, signal wires through the connecting mechanism can be used to transfer signals between the image sensor 26 and the main body 1. The battery module 210 supplies power to the camera module 2.

When using the mobile phone 100, the user can rotate the attachable camera module 2 to an appropriate direction and use the button 240 to select distance between the lens module 22 and the image sensor 26, the optical signal is then focused by the lens module 22 onto the image sensor 26 via the hole 246. The image sensor 26 transforms an optical image signal to an electrical image signal, and the signal linker 212 sends the image signal that is amplified and modulated by the modulator 28 to the main body 1, then the user use the main body 1 to take photos.

Figure 4:
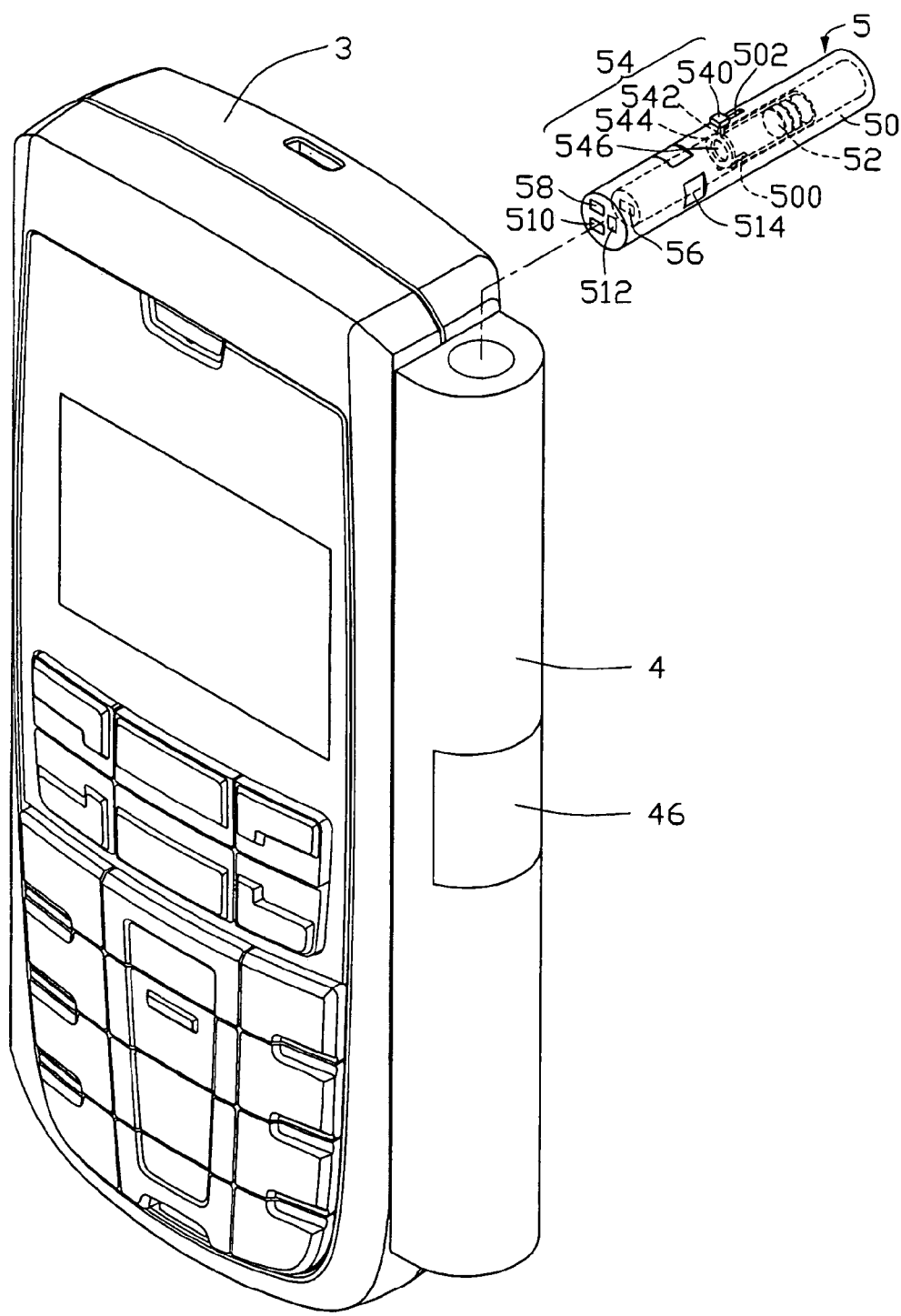
FIG. 4 is an isometric view of a mobile phone including an attachable camera module, in accordance with a second embodiment of the present invention.

Referring to FIG. 4, a mobile phone 300 according to a second embodiment is provided. The mobile phone 300 includes a main body 3, a container 4 and a camera module 5. The container 4 is substantially a cylinder including a planar side face (not labeled) and installed on one side of the main body 3, with the planar side face attached adjacent to the main body 3, and the camera module 5 is contained in the container 4. The camera module 5 can operate either in the container 4 or out of the container 4. The container 4 can be fixed on the main body 3 or detachably connected to the main body 3 in the same way that the attachable camera module 2 is, and be disposed rotatably on the main body 3.

As with the camera module 2 of the first embodiment of the present invention, the camera module 5 comprises a sleeve barrel 50, a lens module 52, an adjusting mechanism 54, an image sensor module 56, a modulator 58, a battery module 510, and a signal linker 512. The sleeve barrel 50, the lens module 52, the adjusting mechanism 54, the image sensor module 56, the modulator 58, the battery module 510, the signal linker 512, a slot 500, a sliding slot 502, a button 540, a gearing pole 542, a holder 544 and a hole 546 are all the same as their corresponding parts in the first embodiment. The signal linker 512 can be signal wires passing through the connecting mechanism 12 or a wireless communicator. The modulator 58 is installed at the bottom of the camera module 5 or the bottom of container 4, and the modulator 58 connects to the image sensor module 56 via the signal linker 512, the modulator 58 amplifies and modulates the image signal from the image sensor 56.

Figure 5:
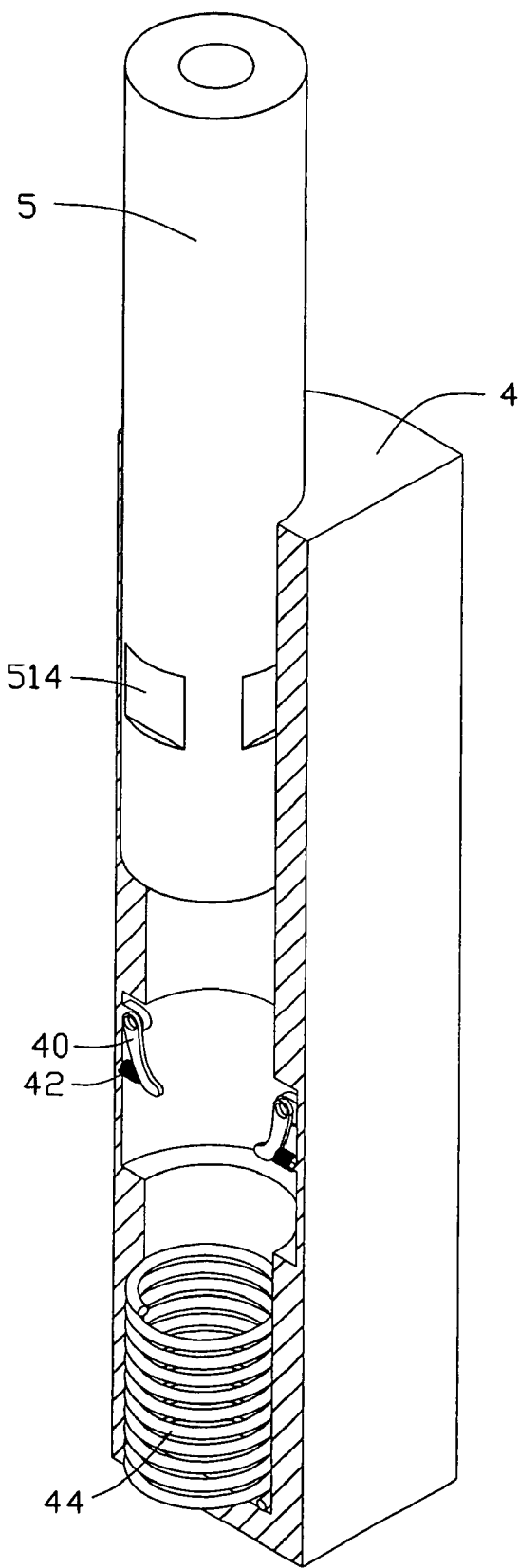
FIG. 5 is a cross-sectional view of a part of the container of the mobile phone.
Figure 6:
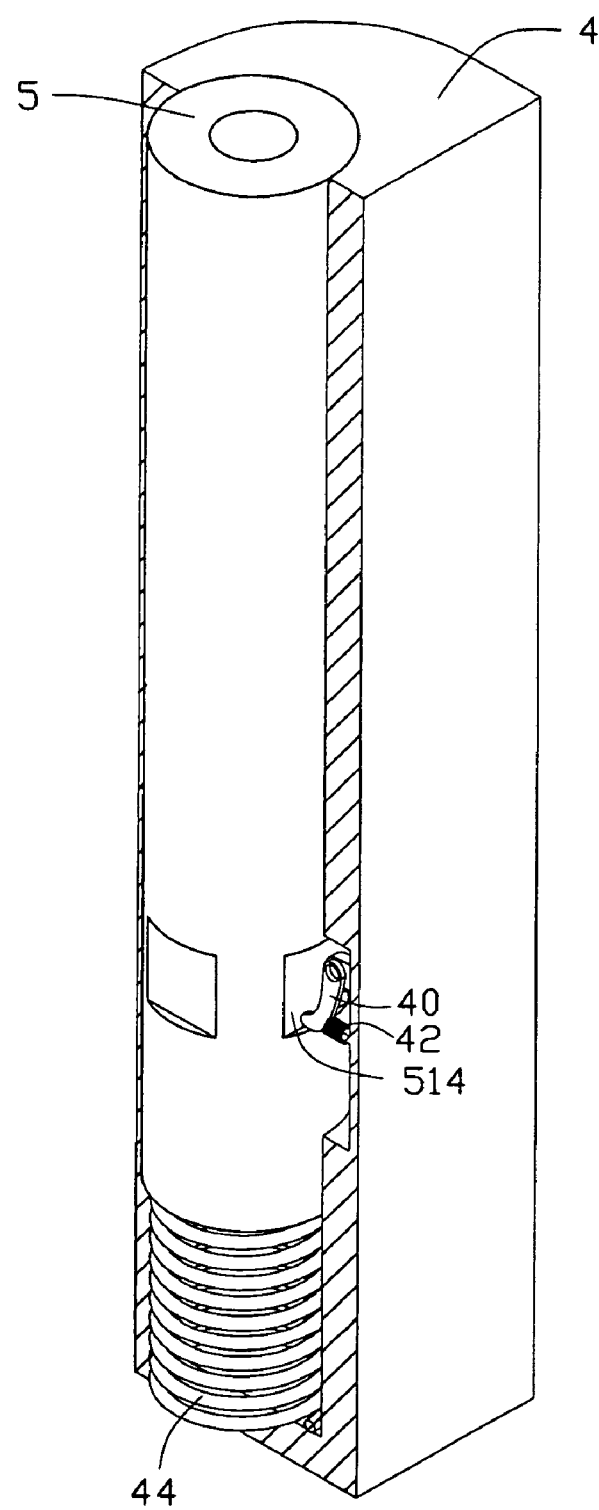
FIG. 6 is a cross-sectional view of cooperation of the attachable camera module and the container.

Referring to FIG. 5, at least one retainer 40 is installed on the inner surface of the container 4. One end of the retainer 40 is rotatably held on the inner surface of the container 4, another end connects to the inner surface of the container 4 via a first elastic component 42 such as a helical spring, and a second elastic component 44 such as a helical spring is installed at the bottom of the container 4. At least one flattened portion 514 is disposed in the exterior surface of the camera module 5. Position and shape of the flattened portion 514 corresponds to that of the retainer 40. When enclosing the camera module 5 into the container 4, presses the camera module 5 to put the retainer 40 into the flattened portion 514, then the first elastic component 42 rebounds to push the end of the retainer 40 connected thereto to clasp the flattened portion 514, such that the camera module 5 is held. When taking the camera module 5 out of the container 4, the user can rotate and press the camera module 5, then the portion without the flute 504 of the camera module 5 will press the retainer 40, the first elastic component 42 is compressed and the retainer 40 is released from the flattened portion 514. At the same time, the second elastic component 44 is compressed. To release the camera module 5, the retainer 40 is released from the flattened portion 514, and the second elastic component 44 drives the camera module 5 to move out of the retainer 40, the camera module 5 can then be entirely taken out.

An opening 46 can be defined in the side of the container 4, the position of the opening 46 corresponds with that of the adjusting mechanism 54. When the camera module 5 is contained in the container 4, the button 540 is exposed to the outside through the just corresponds with the opening 46, so that the camera module 5 can be focused whilst in the container 4. A shield whose shape can be fitted to figure accords with the outer surface of the container 4 can be installed by the opening 46 and can cover the opening 46. A foldaway bracket can be installed on the sleeve barrel 50, when the camera module 5 is taken out from the container 4 the foldaway bracket can hold the camera module 5 whilst taking photos. When using the mobile phone 300 to take photos, the user can rotate the container 4 to an appropriate direction or remove the camera module 5 from the container 4 to an optimal place to take photos. In addition, the camera module 5 can be replaced if it is damaged. The mobile phone 300 can be replaced by a laptop or other kinds of portable electronic devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A portable electronic device, comprising:
   a main body;
   an attachable camera module integrated with the main body, comprising: a sleeve barrel, an image sensor module received in the sleeve barrel, a lens module contained in the sleeve barrel and configured for transmitting image light to the image sensor module, the image sensor module being configured for transforming the image light to electronic image signal, and a signal linker that transfers the image signal from the image sensor module to the main body; and
   a connecting mechanism that connects the main body and the attachable camera module immediately next to each other to integrate the attachable camera module with the main body; the connecting mechanism being installed on one side of the main body to support the attachable camera module.

2. The portable electronic device as claimed in claim 1, wherein one side of the main body defines a through hole; one end of the connecting mechanism is contained in the hole and the other end of the connecting mechanism is fixed on the side of the sleeve barrel.

3. The portable electronic device as claimed in claim 2, wherein the signal linker is a signal wire that connects via the connecting mechanism.

4. The portable electronic device as claimed in claim 2, further comprising a container, wherein the connecting mechanism is an axletree that is installed on one side of the main body, and the attachable camera module is contained in the container, and the container is rotatably connected to the main body by the connecting mechanism.

5. The portable electronic device as claimed in claim 4, wherein at least one retainer and at least one elastic component installed on an inner surface of the container and at least one slot is defined in an outer surface of the sleeve barrel, shape and position of the slot corresponds to that of the retainer.

6. The portable electronic device as claimed in claim 5, wherein one end of the retainer is held on the inner surface of the container and another end of the retainer is held on the inner surface of the container via a first elastic component.

7. The portable electronic device as claimed in claim 6, wherein a second elastic component is located at the bottom of the container, and the bottom of the attachable camera module contacts the second elastic component when the attachable camera module is contained in the container.

8. The portable electronic device as claimed in claim 1, wherein the portable device includes a focusing mechanism installed on the lens module.

9. The portable electronic device as claimed in claim 8, wherein the focusing mechanism includes a button that is installed and can slide on the outer surface of the sleeve barrel, a holder that is installed in the sleeve barrel and used to hold the camera module, and a gearing pole that connects the button and the holder.

10. The portable electronic device as claimed in claim 1, wherein the attachable camera module includes a battery module that is installed at a bottom of the attachable camera module.

11. The portable electronic device as claimed in claim 1, wherein the signal linker is a wireless communicator selected from the group consisting of a wireless fidelity port and a Bluetooth port.

12. The portable electronic device as claimed in claim 1, wherein the sleeve barrel is substantially a cylinder including a planar side face attached adjacent to the main body.

13. A portable electronic device comprising:
a main body;
an attachable, camera module integrated with the main body, positioned immediately adjacent to the main body, and rotatably mounted to the main body, the attachable camera module comprising an optical module and an image sensor, the optical module being configured for routing an optical image signal from outside to the image sensor, the image sensor being configured for transforming the optical image signal into an electronic image signal; and
a signal communicator formed between the attachable camera and the main body, the signal communication being configured for transferring the electronic image signal from the image sensor to the main body.

14. The portable electronic device of claim 13, wherein the signal communicator is a wireless communicator or a signal wire.

15. The portable electronic device of claim 13, wherein the portable electronic device is a mobile phone or a laptop.

16. A portable electronic device comprising:
a main body;
a container rotatably mounted to one side of the main body;
a digital camera module received in the container, thereby being rotatable relative to the main body, the camera module electrically connecting with the main body for transmitting an electronic image signal form the digital camera module to the main body; the camera module defining a flattened portion in an exterior surface thereof;
a retainer installed on an inner surface of the container and corresponding to the flattened portion; and
a first elastic component and a second elastic component installed in the container, wherein the retainer, the flattened portion and the first elastic component cooperate to hold the camera module in the container; when the first elastic component is released from the flattened portion, the second retainer drives the camera module to move out of the container such that the camera module is entirely taken out of the container.

17. The portable electronic device as claimed in claim 16, wherein the retainer is pushed to clasp the flattened portion by the first elastic component to hold the camera module, and the retainer is released from the flatted portion by rotation of the camera module.

18. The portable electronic device as claimed in claim 16, further comprising a plurality of retainers and a plurality of first elastic components corresponding to the retainers, the camera module defining a plurality of flattened portions corresponding to the retainers in the exterior surface thereof.

19. The portable electronic device as claimed in claim 16, wherein the container is substantially a cylinder including a planar side face attached adjacent to the main body.

20. The portable electronic device as claimed in claim 16, wherein the container defines an opening therein, and the camera module is operated using the opening when the camera module is contained in the container.

* * * * *